United States Patent [19]

De Witt

[11] 4,173,596
[45] Nov. 6, 1979

[54] SOFT-SEEDED TOUGHENERS FOR POLYVINYL CHLORIDE

[75] Inventor: Elmer J. De Witt, Cuyahoga Falls, Ohio

[73] Assignee: The B. F. Goodrich Company, Akron, Ohio

[21] Appl. No.: 863,835

[22] Filed: Dec. 23, 1977

[51] Int. Cl.$^2$ ............................................. C08F 279/06
[52] U.S. Cl. ..................................... 428/402; 525/71; 525/80; 525/85; 525/197; 525/238; 525/303
[58] Field of Search ............................ 260/879, 876 R

[56] References Cited

U.S. PATENT DOCUMENTS

| | | | |
|---|---|---|---|
| 3,787,522 | 1/1974 | Dickie | 260/876 R |
| 3,793,402 | 2/1974 | Owens | 260/876 R |
| 3,971,835 | 7/1976 | Myers | 260/876 R |
| 4,026,970 | 5/1977 | Backderf | 260/879 |

*Primary Examiner*—Paul R. Michl

*Attorney, Agent, or Firm*—John H. Faro

[57] ABSTRACT

The impact resistance of rigid polymeric resins (e.g. PVC, SAN, PMMA, etc.,) is enhanced by the incorporation therein of an improved toughener. This toughener comprises three distinct phases: (a) a core of thermoplastic or thermoset resin having a Tg below room temperature, (b) a rubber-like layer overpolymerized on the core, and (c) a relatively hard polymer layer overpolymerized on the rubber layer. The utilization of a "soft" core, or seed, apparently enhances the efficiency of the toughener in the rigid polymer. In one of the preferred embodiments of this invention, the improved toughener comprises a seed derived from a partially corss-linked poly(n-butylacrylate), a rubber-like (or intermediate) layer derived from a monomer mixture containing n-butylacrylate and an addition monomer and an outer layer (or shell) derived from a monomer mixture containing styrene and methylmethacrylate.

9 Claims, No Drawings

SOFT-SEEDED TOUGHENERS FOR POLYVINYL CHLORIDE

BACKGROUND OF THE INVENTION

1. Field of the Invention

This invention is directed to compositions and to a method. More specifically, this invention concerns itself with novel impact modifiers for rigid polymers, the formulation of rigid polymers containing novel impact modifiers and to a method for enhancement of the impact resistance of rigid polymers.

2. Description of the Prior Art

The modification of the physical properties of polymeric materials and articles prepared therefrom has traditionally been achieved through control of the average molecular weight of the resin, subsequent curing of the resinous material so as to initiate cross-linking thereof, or by the addition of substances, which are at least partially phase compatible (hereinafter referred to as "modifiers") to the polymer matrix. Where the latter avenue is followed, the modifying substance can be associated with the polymer by chemically bonding thereto or by simply intimately blending the modifying substance into the polymer. The modifying substance will ordinarily be selected because it possesses certain properties in which the polymer is deficient. The extent of modification of the polymer will generally be dependent upon the relative concentration of modifier to polymer in the resinous formulation. Where enhancement of one or more of the polymer properties is attempted by the inclusion of modifiers, one or more of the intrinsic properties of the host polymer may be adversely affected. For example, it is widely recognized that attempts in enhancement of the impact resistance of the polymers through the use of modifiers can adversely alter the tensile strength, clarity, resistance to chemical degradation and the resistance of the polymer to photodegradation, as well as result in depression of its heat distortion temperature. The above potential adverse consequences have not discouraged modification of polymeric resins by the inclusion of a variety of such agents. However, an awareness of the potential problems inherent in the use of such modifiers has resulted in an appreciation of the somewhat "empirical" character of the research in this area. This is evidenced by the rather specific combinations of materials disclosed in the prior art as impact modifiers for PVC (see U.S. Pat. Nos. 3,562,235; 3,661,994; 3,655,825; 3,655,826; 3,760,035; 3,763,279; and 4,026,970); for ABS (see U.S. Pat. No. 3,879,496); for the acrylates (see U.S. Pat. No. 3,562,235—previously referenced); and for a variety of other well known polymers and copolymers. As is apparent from the above patent disclosures, the impact modifiers disclosed therein are composite particles having a plurality of distinctly layered components.

Many of the above composite particles can be prepared by well known emulsion and/or suspension polymerization techniques. This is readily achieved by the initiation of polymerization of a seed monomer by well known emulsion polymerization techniques. The polymerization of the seed monomer is accomplished under conditions designed for strict control of the particle size of the seed. Subsequent to formation of the seed monomer into discrete polymer particles in the aqueous emulsion, a second monomer or mixture of monomers can be added thereto and overpolymerized on the seed particles; (see U.S. Pat. No. 2,520,259). As taught in U.S. Pat. No. 2,520,259, the newly added monomer can be directively overpolymerized, or caused to be deposited upon the seed latex particles to the substantial exclusion of new particle formation by means of control of emulsifier coverage on the growing latex particles. This second monomer, which is added to and polymerized upon the seed latex particle, can be a rubbery acrylate polymer such as that disclosed in U.S. Pat. No. 3,251,904. Still yet, a third monomer or combination of monomers can be further polymerized upon the rubbery phase of suspended polymer particles using analogous techniques and equipment. The materials used in each of the distinct phases of the toughener, prepared as described hereinabove, are selected not only for their individual properties, but for their compatibility with each of the materials in the distinct phases of the resultant composite particle. Moreover, the outermost portion of the particle is selected for its compatibility with the host or matrix polymer within which the toughener is to be dispersed.

As noted hereinabove, at the core of each such composite particle is a seed which can be prepared from a variety of materials depending upon the properties desired for the ultimate composite particles. Seeded tougheners are disclosed in the patent literature wherein the seed has a Tg in excess of room temperature (e.g. U.S. Pat. Nos. 3,661,994 and 4,026,970). The patent literature also discloses "unseeded" impact modifiers comprising a plurality of separate and distinct phases (e.g. U.S. Pat. Nos. 3,562,253; 3,655,825; and 3,655,826). In such "unseeded" particles, the outer shell is formed in two separate stages, thus given the appearances of a three phase system although only containing essentially two functional distinctive phases.

Impact modifiers (also hereinafter referred to as "tougheners") wherein the seed has a Tg substantially below room temperature will be referred to throughout the balance of this disclosure as "soft-seeded tougheners"; whereas, an impact modifier wherein the seed has a Tg in excess of room temperature will be referred to throughout the balance of this disclosure as "hard-seeded tougheners".

Notwithstanding the enhancement in impact resistance of rigid polymers by the inclusion of one or more of the above modifying agents, further improvement is still required. As indicated previously, impact modifiers, as well as other modifying agents, often adversely alter the intrinsic physical properties of polymeric materials even when only present therein at relatively low concentrations. Thus, there is a continuing need for impact modifiers which are effective at increasing the toughness of the host polymer and yet can efficiently achieve such a result at concentrations having a minimum of adverse impact upon the host resin.

SUMMARY OF THE INVENTION

Accordingly, it is the object of this invention to supplement the deficiencies in the prior art by providing improved impact modifiers for rigid polymeric resinous materials.

More specifically, it is the principal object of this invention to provide an improved impact modifier for PVC resins.

Another object of this invention is to provide improved impact modifiers prepared by emulsion polymerization in the presence of a seed latex.

Yet another object of this invention is to provide an improved impact modifier comprising a composite particle having three separate and distinct phases.

Still another object of this invention is to provide a "soft-seeded" impact modifier.

Additional objects of this invention include the provision of impact modified resins and a method for enhancement in the impact resistance of articles prepared from such modified resins.

The above and related objects are achieved by providing an impact modifier prepared from a seed latex comprising polymer particles having an average size in the range of from about 200 to about 2,000 Å units. The polymer particles of this seed latex preferably consist essentially of a partially cross-linked poly(alkyl acrylate) or copolymers of an alkyl acrylate and an addition monomer. The Tg of this addition monomer can be in excess of room temperature and will only be present in the seed in minor quantities relative to the structural units derived from the alkyl acrylate. In one of the preferred embodiments of this invention, the seed copolymer is also at least partially cross-linked. A second or rubbery layer is overpolymerized upon the seed polymer particles of the latex. This rubber layer can comprise poly (butadiene), copolymers of butadiene and an alkyl acrylate ester, copolymers of butadiene and other addition monomers or copolymers of an alkyl acrylate ester and other addition monomers. The addition monomers which can be present in this rubber-like layer are essentially the same which can be used in preparation of the soft seed. It is understood that the seed particle and the rubber-like layer associated therewith are chemically distinct from one another. A third distinct phase is thereafter overpolymerized upon the rubbery phase. This third and outermost layer of the modifier is relatively hard in comparison to the rubbery layer and is at least partially phase compatible with, or capable of chemically interacting with, the rigid host polymer matrix so as to insure the creation of a substantially cohesive resinous material. Impact modified articles can thereafter be prepared by pre-blending an impact modifier of the type described hereinabove with the rigid resin. The amount of impact modifier used in conjunction with the resin will generally range from about 1 part to about 30 parts by weight per 100 parts by weight host resin, although higher concentration can also be used.

DESCRIPTION OF THE INVENTION INCLUDING PREFERRED EMBODIMENTS

The polymer particles described hereinabove can be prepared by seeded emulsion polymerization techniques. Seeded polymerizations are generally carried out in the presence of a preformed particle, with the intent that the original particle of dispersed polymeric material be used as the situs for polymerization of an additional monomer or mixture of monomers.

In preparing the new composite particles of this invention, a latex is initially provided wherein polymer particles are dispersed in an aqueous medium. These polymer particles have an average size range of from about 200 to about 2,000 Å units. The latexes suitable for use in preparation of the modifiers of this invention can be prepared by emulsion polymerization of an alkyl acrylate monomer and a cross-linking agent or a mixture of monomers containing an alkyl acrylate and addition monomer having a Tg in excess of room temperature. The alkyl component of the alkyl acylate monomer comprises an aliphatic or alicyclic hydrocarbon having 3 to 12 carbon atoms. The addition monomers suitable for use in conjunction with the alkyl acrylate in formation of the seed latex can be either a vinyl monomer (e.g. styrene, vinyl toluene, t-butyl styrene, vinyl chloride, etc.); an acrylic acid ester (e.g. methyl acrylate, methyl methacrylate, ethyl acrylate, n-butyl acrylate, etc.); or a nitrile functional addition monomer (e.g. acrylonitrile, methacrylonitrile, etc.). In each of the copolymers prepared from n-butyl acrylate and one of the above monomers, the relative weight ratio of structural units of the copolymer derived from n-butyl acrylate will in every instance exceed the contribution of the addition monomer; and, furthermore, the amount of contribution of the addition monomer to the copolymer seed will also be further limited so as to insure that the Tg of the seed is maintained within the limits set forth herein.

The polymer particles of the seed latex prepared from the above materials will have a glass transition temperature (Tg) substantially below room temperature (which is pegged, for the purposes of this invention, at $\sim 20°$ C.). In one of the preferred embodiments of this invention, the polymer particles of the seed latex will be at least partially cross-linked. This may be achieved by the addition of a bi- or polyfunctional monomer to the initial monomer charge used in formation of the seed latex. The addition monomers referred to hereinabove can also serve to cross-link the seed. The presence and level of cross-linking monomer can be critical in the formation of a satisfactory seed latex. Generally, satisfactory seed latexes can be prepared where the cross-linking monomer is present at a concentration in the range of from about 0.1 to about 5% by weight, based upon the concentration of the other monomers used in preparation of the seed latex. The preferred cross-linking monomers suitable for use in preparation of the seed latex should have the ability to cross-link the alkyl acrylate uniformly. Cross-linking monomers which possess this capability are those which are incorporated uniformly during the polymerization reaction (such uniform incorporation being independent of the extent of the completion of the reaction). In other words, their rate of consumption is essentially the same as that of the monomers dispersed within the aqueous medium. Representative of such suitable cross-linking monomers are the allyl acrylates and methacrylates, the alkylene glycol diacrylates, (e.g. ethylene glycol diacrylate, 1,3-butylene glycol diacrylate, 1,4-butylene glycol diacrylate, and propylene glycol diacrylates) and trimethylol-propane-triacrylate. Additional cross-linking monomers which are also suitable for use in preparation of the seed latex include the dimethyl homologs of the diacrylates referred to hereinabove, divinyl benzene, divinyl adipate and diallyl phthalate. The polymer particles of the seed latex will generally comprise from about 5 to 20 weight percent, and preferably from about 7 to 10 weight percent of the impact modifier particle. Seed latexes suitable for use in this invention are commercially available from The BFGoodrich Company, (e.g. GEON® 460X2 consisting essentially of copolymers of ethyl acrylate or butyl acrylate with vinyl chloride) and other sources.

Subsequent to preparation of the seed resin latex in the manner described above, butadiene, or a monomer mixture containing butadiene and an alkyl acrylate ester monomer or comonomers of an alkyl acrylate ester and an α-alkyl acrylate ester, and the usual polymerization adjuvants are added to the latex, (the relative proportions being selected to favor polymerization of these monomers on the dispersed seed resin particles to the substantial exclusion of new particle initiation). Their polymerization is effected in a closed vessel at a temperature in the range of from about 20 to about 100° C. (more preferably from about 35 to 70° C.). The reaction is allowed to continue until essentially all of the monomeric materials have been polymerized on the seed latex polymer particles. In the unlikely event that the polymerization of the monomers fails to achieve at least substantially complete conversion to the polymer, then the unreacted monomer should be stripped from the latex (e.g. by distillation under vacuum).

Since the seed latex is made with low dispersant coverage, it may be desirable to add more dispersant subsequent to or during polymerization in order to completely stabilize the finished latex during the stripping, storage, and handling operations referred to hereinabove. In the event that the resultant latex is to be stored for any significant period of time prior to further processing, it is advisable to heat the latex to a temperature sufficient to destroy any catalyst remaining in the system thereby stabilizing the polymer.

The finely dispersed particles produced as described hereinabove are further processed by contact with an α-substituted monoolefin and α-alkyl alkyl acrylate ester monomer by introduction of said monomers into an aqueous medium containing the dispersed polymer particles. The conditions of the medium are adjusted so as to effect polymerization of the newly added monomers upon the suspended polymer particles present in the dispersant. The process conditions are selected, as described with respect to the previous polymerizations, so as to insure that essentially all of the monomers introduced into the systems copolymerize on the surface of the dispersed polymer particles present therein. The monomers selected for this final polymerization are intended to enhance the compatibility of the resultant impact modifier within the host resin thereby insuring formation of a coherent impact modified polymeric material when dispersed within the resin. The outermost coating formed by overpolymerization of these monomers on the preformed rubbery layer of the suspended polymer particles is relatively hard in comparison to this rubbery interlayer. The process conditions prevailing during such overpolymerization are essentially the same as described hereinabove. The polymer particles thus produced can be readily recovered from the dispersant by coagulation of the latex or by spray drying. With respect to this final polymerization, it is usually desirable to allow the polymerization reaction to proceed to completion.

The macrogranular product obtained as a result of the above procedures will generally contain from about 5 to about 20% (preferably from about 7 to about 10%) seed, from about 50 to about 75% (preferably from about 65 to about 70%) rubbery intermediate layer and from about 15 to 40% (preferably from about 18 to about 25%) shell or exterior layer. If unsaturation is present in, for example, the rubbery layer, an antioxidant will generally be added to stabilize such materials.

The impact modifier having the above composition can be readily intimately incorporated within a host matrix in any convenient manner. The impact modifier and the resin can be blended in an internal mixture and the powder blend transferred to a roll mill wherein the rolls are maintained at temperatures indicated for the final fluxing under shear at high temperatures.

An alternative procedure for incorporating the impact modifier within a vinyl chloride host resin is to blend an aqueous dispersion containing the impact modifier with a like suspension of virgin vinyl chloride resin (insuring freedom from contamination of the vinyl chloride resin by a rubbery phase). The blended suspension may thereafter be coagulated, filtered, washed, dried and finally masticated as necessary. The latter preferred blended suspension has the advantage of being easier to dry than the impact modifier per se, where such product is separated from the suspension prior to being associated with the vinyl chloride resin.

The concentration of impact modifier within the host resin matrix can range from about 1 to about 25 parts by weight impact modifier per 100 parts by weight host resin matrix.

The impact modified resinous compositions of this invention can also include a variety of other stabilizers and compounding ingredients. In a preferred composition of this invention, the impact modified PVC will also contain the usual vinyl chloride resin stabilizers in the usual proportions. Among the preferred stabilizers suitable for use in conjunction with the preferred formulations of this invention are the organo-tin type of stabilizer, such as dibutyl tin diglycolate (available commercially as Thermolite 31, available from Metal and Termite Corporation); or dibutyl tin dilaurate.

In addition to such stabilizers, the compositions of this invention can also contain minor amounts of colorants, fillers, pigments, opacifiers, lubricants, processing aids and other conventional processing ingredients. These additional agents can be incorporated within the formulation during mastication thereof or dry mixed with the granular product before it is used in the fabrication of structural materials.

The amount of working of the formulation required to develop optimum impact resistance in the final blend is not susceptible of precise definition. However, an operative amount of working can be described with respect to a specific type of apparatus and a standard mixing procedure (e.g. a two-roll differential plastic mill having oil-heated rolls 4" in diameter which rotate at 15/20 rpm respectively). The final blended composition including fillers, stabilizers, lubricants, and other conventional compounding ingredients (in powder mix form) is placed on such rolls and mixing initiated and continued until the material coalesces to form a sheet on one of the rolls. The time of mixing is measured from the latter point, there being required usually from two to five minutes at the mill roll temperatures specified during which time the stock is repeatedly cut back and forth across the mill to insure homogeneity.

A mill-mixed stock in sheet form, prepared in the above manner, can then be preheated to a temperature about 10° F. above its milling temperature and molded for 3 minutes in an ASTM standard sheet mold maintained at the preheat temperature under 30,000 pounds pressure. The resulting press-molded sheet is cooled in the mold and the ASTM Izod impact strength (ASTM No. D-256-56 Method A) determined on preselected specimens of the above-molded sheets. In selected cases, the ASTM heat distortion temperature (HDT) is also determined on the pressed-molded tensile sheets employing ASTM Procedure No. 648-56 at 264 psig.

EXAMPLES

The following examples are provided to illustrate the preparation and evaluation of both the impact modifiers and impact modified formulations containing such modifiers. Apparatus and techniques used in preparation and evaluation of the materials of this invention are standards or as hereinbefore described. Parts and percentages in such examples are by weight unless otherwise indicated.

EXAMPLE I

A seed latex was prepared from the following formulation:

| SEED LATEX | PHM | GRAM |
|---|---|---|
| Water | 250 | 3250 |
| Siponate DS-10 | 4 | 52 |
| Potassium Persulfate | .1 | 1.3 |
| Styrene | 40 | 520 |
| n-Butyl Acrylate | 60 | 780 |
| Allyl Methacrylate | 3 | 39 |

Temp. 65° C.
Charging Factor 13XPHM = Grams

Procedure: A, round-bottomed, 3-necked flask was fitted with a stirrer, condenser, nitrogen inlet and outlet, and a thermometer. The flask was suspended in a constant temperature, stirred water bath. The flask was charged with oxygen-free water and the Siponate. The contents were stirred and heated to 65° C. under a nitrogen atmosphere. At 65° C. the persulfate was added and the monomers pumped into the reaction flask during a period of about one and one-half hrs. Particle size was about 650 Å.

EXAMPLE IA

The procedures of Example I were repeated except for the substitution of vinyl chloride for styrene. The polymerization of these monomers is carried out in a pressurized vessel at superatmospheric pressure. All other conditions were essentially the same. The particle size of the seed thus produced is approximately 650 Å.

EXAMPLE II

A rubber coated seed was prepared by overpolymerization of styrene and butadiene monomers upon the seed of Example I. The formulation used in preparation of the rubber coated seed was as follows:

| | | PHM | GRAMS |
|---|---|---|---|
| 1. | Water | 300 | 27,216 |
| 2. | NH$_4$OH (28%) | .71 | 64.4 |
| 3. | Seed Latex (Ex.I) | 45 | 4,082 |
| 4. | Sequestrene NaFe | .01 | .91 |
| 5. | Formopon | .1 | 9.1 |
| 6. | p-Menthane Hydroperoxide 60% | .33 | 30 |
| 7. | Styrene | 25 | 2,268 |
| 8. | Butadiene | 75 | 6,804 |
| 9. | Siponate DS-10 | 1.2 | 109 |

Temp. 55° C.
Charging Factor 90.72XPHM = Grams

Into a 15 gallon glass lined reactor was charged ingredients #1–5 and 7. One liter of water (ingredient #1) was held in reserve and ingredient #9 (soap) dissolved therein. The reactor is sealed, purged with nitrogen for 15 minutes to achieve a substantially oxygen free atmosphere and ingredient #8 (butadiene) thereafter injected into the reactor. The pot temperature was increased to about 55° C. and polymerization of the monomer initiated by addition of ingredient #6 (peroxide initiator) to the charge. After the polymerization reaction has been allowed to proceed for two hours, the soap solution is pumped into the reactor. Upon conversion of 90–95% of monomer to polymer, the pot temperature was gradually increased to 65° C. and the reactor vented to allow for removal of butadiene monomer. A vacuum is drawn on the reactor and the vacuum broken with nitrogen. The latex prepared in the above manner is now ready for overpolymerization of the outer shell layer.

EXAMPLE III

The rubber coated seed, prepared in the manner described in Example II, can now be overpolymerized with a relatively hard plastic material by emulsion polymerization of certain monomers in a latex containing this rubber coated seed. The ingredients used in this procedure were as follows:

| | PHM | GRAMS |
|---|---|---|
| Seeded Rubber Latex (Example II) | 320 | 40640 |
| Potassium Persulfate | .025 | 3.2 |
| Methyl Methacrylate | 16 | 2032 |
| Styrene | 4 | 508 |

Temp. 65° C.
Charging Factor 127XPHM = Grams

The rubber coated seed was heated to 65° C. under nitrogen and potassium persulfate added to the reactor. A mixture containing methyl methacrylate and styrene (in the above proportions) was gradually introduced into the reactor over a two hour period. The polymerization reaction, which follows, was allowed to proceed uninterrupted (98% or greater conversion of monomer to polymer), the pot temperature increased to 90° C. and maintained at that level for a duration sufficient to drive the polymerization reaction to virtual completion and to effect decomposition of the polymerization catalyst. The contents of the reactor were cooled to about room temperature (30° C. or below) and an emulsion containing the antioxidant GOODRITE ® 3114 (available from BFGoodrich Company) added to the latex. The latex was filtered through cheesecloth for removal of coagulum and the toughener separated from the remaining fluid fraction by spray drying.

EXAMPLE IV

A rubber coated seed was prepared from the following formulation:

| | | PHM | GRAMS |
|---|---|---|---|
| 1. | Water | 300 | 27216 |
| 2. | Ammonium Hydroxide (28%) | .71 | 64.4 |
| 3. | Seed Latex (Example I) | 45 | 4082 |
| 4. | Sequestrene NaFe | .01 | .91 |
| 5. | Formopon | .1 | 9.1 |
| 6. | p-Menthane Hydroperoxide | .33 | 30 |
| 7. | Butyl Acrylate | 30 | 2722 |

-continued

|     |              | PHM | GRAMS |
| --- | ------------ | --- | ----- |
| 8.  | Butadiene    | 70  | 6350  |
| 9.  | Siponate DS-10 | 1.2 | 109 |

Temp. 55° C.
Charging Factor 90.72XPHM = Grams

The technique for the overpolymerization of these elastomers upon the seed was essentially the same as described in Example II. After preparation of the rubber coated seed from the above formulation, a relatively hard outer shell was overpolymerized thereon utilizing essentially the same formulation and procedure of Example III.

EXAMPLE V

A rubber coated seed was prepared from the following formulation:

|     |                          | PHM | GRAM  |
| --- | ------------------------ | --- | ----- |
| 1.  | Water                    | 300 | 27216 |
| 2.  | Ammonium Hydroxide (28%) | .71 | 64.4  |
| 3.  | Seed Latex (28.8%) (Example I) | 45 | 4082 |
| 4.  | Sequestrene NaFe         | .01 | .91   |
| 5.  | Formopon                 | .1  | 9.1   |
| 6.  | p-Methane Hydroperoxide (60%) | .33 | 30 |
| 7.  | Butyl Acrylate           | 80  | 7258  |
| 8.  | Butadiene                | 20  | 1814  |
| 9.  | Siponate DS-10           | 1.2 | 109   |

Temp. 55° C.
Charging Factor 90.72XPHM = Grams

The technique for the overpolymerization of these elastomers upon the seed was essentially the same as described in Example II. A shell was thereupon overpolymerized upon the rubber coated seed in the manner described in Example III.

EXAMPLE VI

A rubber coated seed having a partially cross-linked poly (n-butyl acrylate) rubbery layer was prepared from the following formulation:

|     |                        | PHM  | GRAM  |
| --- | ---------------------- | ---- | ----- |
| 1.  | Water                  | 300  | 27216 |
| 2.  | Seed Latex (26.8%) (Example I) | 45 | 4082 |
| 3.  | Potassium Persulfate   | .25  | 22.7  |
| 4.  | n-Butyl Acrylate       | 100  | 9072  |
| 5.  | Trimethylol Propane Triacrylate | 1 | 90.7 |
| 6.  | Siponate DS-10         | 1.2  | 109   |

Temp. 65° C.
Charging Factor 90.72XPHM = Grams

Into a 15 gallon glass lined reactor was charged ingredients #1, 2 and 3. About 3000 grams of water was held in reserve for later addition to the charge. The reactor is thereupon sealed, evacuated and the vacuum broken thereafter with nitrogen. After substantially all oxygen has been purged from the vessel, the temperature was increased to 65° C. Ingredients #4, 5 and 6 were then combined with the remaining water in a separate tank and nitrogen bubbled through the fluid until the aqueous medium has been effectively deaerated. This deaerated fluid containing ingredients #4, 5 and 6 was then pumped into the reactor over a three to four hour period. When the polymerization of the n-butyl acrylate has proceeded to completion, shell forming monomers were combined with the resultant layer and overpolymerized upon the polymer solids contained therein according to the procedures described in Example III.

EXAMPLE VIA

The procedures of Example VI were repeated, except for the substitution of the seed latex of Example IA for the seed latex of Example I. Subsequent to completion of the overpolymerization of the n-butyl acrylate upon the seed of Example IA, shell forming monomers are added to the latex and overpolymerized upon the rubber coated seed in the manner described in Example III. The monomers selected for such shell are the same as in Example III in the same relative proportions.

The rubbery layer of the toughener particles of this invention can contain, as illustrated in Examples II, IV, V, VI and VIA, a number of combinations of materials. Where the rubbery layer is a copolymer, the relative proportions of monomers contained therein is adjusted to insure the preparation of a polymeric phase which is elastomeric in character. Similarly, the shell which is overpolymerized upon the rubbery phase can contain any one or combination of monomers previously noted. Where the shell is a copolymer, the relative proportions of monomers contained therein is adjusted to insure preparation of a polymeric phase which is both relatively hard in comparison to the rubbery phase and provides good phase compatibility with the rigid host polymer resin. In both the preparation of this rubbery phase and the shell layer, the relative proportions of monomers contained therein is not critical and can vary within broad limits and yet still provide a polymeric particle having the requisite functional attributes.

EXAMPLE VII

The rubber coated seed of Example VI is overpolymerized with a relatively hard plastic material by emulsion polymerization of certain monomers in a latex containing this rubber coated seed. The ingredients used in this procedure were as follows:

|     |                               | PHM | GRAMS  |
| --- | ----------------------------- | --- | ------ |
| 1.  | Seeded Rubber Latex (Example VI) | 240 | 40,080 |
| 2.  | Methyl Methacrylate           | 36  | 6,012  |
| 3.  | Ethyl Acrylate                | 4   | 668    |

Temp. 65° C.
Charging Factor 167XPHM = Grams

A latex containing the rubber coated seed of Example VI is charged to a glass lined reactor and deaerated by bubbling nitrogen through the emulsion for an appropriate interval. The reactor was thereafter sealed and the latex heated to 65° C. under a nitrogen blanket. Ingredients #2 and 3 were combined and the combined stream injected into the reactor over a two hour period. After polymerization of the shell forming monomer has proceeded to completion, the pot temperature was increased to about 90° C. to terminate the polymerization and decompose the polymerization catalyst. The charge was allowed to cool to room temperature and the toughener separated from the latex by spray drying.

EXAMPLE VIII

The tougheners prepared in accord with the foregoing Examples were evaluated in the following manner. The toughener was formulated with a host polymer by physically mixing of the toughener, host polymer, processing aids, stabilizer and filler in the appropriate proportions. This mixture was then heated to a temperature in the range of from about 320° to 370° C. (depending upon the host polymer) in a roll mill. The mill-mixed stock in sheet form was stripped from the mill roll and molded in a preheated (~350° F.) standard ASTM mold for 7 minutes at relatively low pressure and then at high pressure (30,000 psig) for an additional 3 minutes. The press-molded sheet, thus obtained, was cooled, removed from the mold and cut and notched for Izod impact strength testing (ASTM No. D-256-56, Method A).

The following tougheners were evaluated in GEON® 110X334, (a suspension grade PVC marketed by B. F. Goodrich Company):

| | RECIPE |
|---|---|
| 1. | 100 g GEON 110X334[(1)] |
| 2. | 2 g Thermolite 31 |
| 3. | 2 g K-120 N |
| 4. | 2 g Calcium Stearate |
| 5. | 5 g Titanium Dioxide |
| 6. | Variable Toughener |

1. = PVC, 2. = stabilizer, 3. = processing aid
4. = Lubricant, 5. = filler
[(1)]GEON 110X334 is a suspension grade PVC (BFGoodrich) with an Inherent Viscosity of 0.70 at 0.4% solution in cyclohexanone at 25° C.

| Sample No. | Toughener 7 | Toughener 5 + Shell 3 | Notched Izod |
|---|---|---|---|
| A | 6 grams | — | 96.J/m |
| B | 7 grams | — | 115.J/m |
| C | 8 grams | — | 904.J/m |
| D | — | 6 g | 96.J/m |
| E | — | 7 g | 140.J/m |
| F | — | 8 g | 581.J/m |
| G | — | — | 85.J/m |

EXAMPLE IX

The procedure of Example VIII was repeated with the following recipe:

RECIPE
100 g GEON 110X334
2.5 g Thermolite 31 (Stabilizer)
2 g K-120 N (Processing Aid)
2 g W2XE (Lubricant)
.25 g Polyethylene (Lubricant)

| Sample No. | Toughener 2 + Shell 3 | Notched Izod |
|---|---|---|
| A | 8 g | 359.J/m |
| B | 9 g | 425.J/m |
| C | 10 g | 826.J/m |
| D | — | 85.J/m |

EXAMPLE X

The toughener of Example IV was evaluated in PVC at −20° C. in accord with the procedures of Example VIII. The only other departure from Example VIII involved selection of a PVC resin which had a somewhat greater inherent viscosity. The results of such evaluation are as follows:

| Sample No. | Toughener Example 4 | Notched Izod - 20° C. |
|---|---|---|
| A | 8.8 g | 107.J/m |
| B | 11.7 g | 198.J/m |
| C | 13.2 g | 243.J/m |
| D | 14.6 g | 684.J/m |
| E | 17.6 g | 785.J/m |
| F | — | 15.J/m |

PVC used in evaluation was GEON 103EPF76, a B. F. Goodrich product having an inherent viscosity of 0.90 at 0.40% solution in cyclohexanone at 25° C.

EXAMPLE XI

The toughener of Example VII was evaluated in PVC in accord with the procedure of Example VIII. The recipes and results of such evaluation are as follows:

RECIPE
100 g GEON 103EPF76 (PVC)
2 g Thermolite 31 (Stabilizer)
1.75 g Calcium Stearate (Lubricant
1.75 g Carlyl Wax 280 (Lubricant)
15 g Titanium Dioxide (Filler)
Variable Toughener Procedure same as in Example VIII except milling and molding temperature were 370° F.

| Sample No. | Toughener Example VII | Notched Izod |
|---|---|---|
| 1 | 4 grams | 1006.J/m |
| 2 | 6 grams | 1222.J/m |
| Control | — | 52.J/m |

EXAMPLE XII

The toughener of Example III was evaluated in styrene/acrylonitrile copolymer, polystyrene, and poly(methylmethacrylate) in accord with the procedures of Example VIII. The test method used in such evaluation was ASTM-D256-72a, Izod Notch Width=⅛ inch. The table which follows illustrates the effectiveness of the toughener in a variety of different polymer compositions.

| Sample No. | Toughener Example III | Stearic Acid | Dow[4] SAN-111 | Plexi-glass[3] Y-811 | Sty-ron[2] 685 | Notch[1] Izod |
|---|---|---|---|---|---|---|
| A | 30 grams | 1 gram | 70 g | | | 372.J/m |
| B | 35 grams | " | 65 g | | | 432.J/m |
| C | 30 grams | " | | 70 g | | 120.J/m |
| D | 35 grams | " | | 65 g | | 130.J/m |
| E | 30 grams | " | | | 70 g | 107.J/m |
| F | 35 grams | " | | | 65 g | 209.J/m |
| G | — | — | 100 g | — | — | 13.J/m |
| H | — | — | — | 100 g | — | 10.J/m |
| I | — | — | — | — | 100 g | 10.J/m |

[1]ASTM-D256-72a, Notch width = ⅛ inch
[2]Polystyrene
[3]Polymethmethacrylate
[4]Copolymer of styrene and acrylonitrile used extensively in ABS resins The foregoing Examples clearly demonstrate that the tougheners of this invention are effective in enhancing the impact resistance of a variety of host polymers. The "soft seeded" tougheners of this invention even retain this capability at temperatures substantially below freezing (as demonstrated in Example X). These Examples also illustrate that the degree of enhancement is dependent upon the concentration of the toughener in the host polymer.

What is claimed is:

1. A composition comprising polymer particles prepared by (a) providing a seed latex wherein the polymer particles have an average size in the range of from about 200 to 2000 Å and a $T_g$ less than about 20° C., said seed consisting essentially of a polymer derived from an alkyl acrylate monomer and from about 0.1 to about 5 weight percent cross-linking monomer or a copolymer derived from a major amount, by weight, of an alkyl acrylate monomer, a minor amount, by weight, of an addition monomer and from about 0.1 to about 5 weight percent cross-linking monomer, the alkyl moiety of the alkyl acrylate monomer comprising an aliphatic or alicyclic hydrocarbon radical having 3 to 12 carbon atoms and the addition monomer being selected from the group consisting of vinyl, acrylic acid ester and nitrile functional monomers derived from acrylic acid esters; (b) contacting said polymer particles within the latex with butadiene monomer or a monomer mixture containing butadiene and an alkyl acrylate ester or butadiene and an addition monomer under conditions designed for the overpolymerization of said monomers on the polymer particles of the latex to the substantial exclusion of the formation of new polymer particles therefrom; and (c) contacting the overpolymerized polymer particles of said latex formed in step (b) with a monomer mixture containing an α-aryl substituted monoolefin and an α-alkyl alkylacrylate ester monomer under conditions designed for overpolymerization of said monomers on the polymer particles of the latex to the substantial exclusion of the formation of new polymer particles within said latex;

the relative proportion of structural units in the copolymer component of step (b) being adjusted to insure that such component is elastomeric in nature, and the relative proportion of structural units in the copolymer component of step (c) being adjusted to insure that such component is harder than the component of step (b); and the relative concentration in the composition of the component of step (a) being in the range of from about 5 to about 20 weight percent; the concentration of the component of step (b) being in the range of from about 50 to about 75 weight percent; and, the concentration of components of step (c) being in the range of from about 15 to about 40 weight percent.

2. The composition of claim 1 wherein the seed polymer consists essentially of poly (n-butylacrylate).

3. The composition of claim 1 wherein the seed polymer consists essentially of a copolymer of n-butylacrylate and a vinyl monomer.

4. The composition of claim 1 wherein the seed polymer consists essentially of a copolymer of n-butylacrylate and an acrylic acid ester.

5. The composition of claim 1 wherein the seed polymer consists essentially of a copolymer of n-butylacrylate and a nitrile functional polymer derived from acrylic acid.

6. The composition of claim 1 wherein the seed polymer particles consists essentially of a copolymer of n-butylacrylate and a monomer selected from the group consisting of vinyl halides, methylmethacrylate, styrene and vinyl toluene.

7. The composition of claim 1, wherein the seed is overpolymerized with a monomer mixture containing butadiene and an alkyl acrylate ester.

8. A composition comprising a rigid polymer and an impact modifier effective amount of a toughener comprising polymer particles prepared by (a) providing a seed latex wherein the polymer particles have an average size in the range of from about 200 to 2000 Å and a $T_g$ less than about 20° C., said seed consisting essentially of a polymer derived from an alkyl acrylate monomer and from about 0.1 to about 5 weight percent cross-linking monomer or a copolymer derived from a major amount, by weight, of an alkyl acrylate monomer, a minor amount, by weight, of an addition monomer and from about 0.1 to about 5 weight percent cross-linking monomer, the alkyl moiety of the alkyl acrylate monomer comprising an aliphatic or alicyclic hydrocarbon radical having 3 to 12 carbon atoms and the addition monomer being selected from the group consisting of vinyls, acrylic acid esters and nitrile functional monomers derived from acrylic acid esters; (b) contacting said polymer particles within the latex with butadiene monomer or a monomer mixture containing butadiene and an alkyl acrylate ester or butadiene and an addition monomer under conditions designed for overpolymerization of said monomers on the polymer particles of the latex to the substantial exclusion of the formation of new polymer particles therefrom; and (c) contacting the overpolymerized polymer particles of said latex formed in step (b) with a monomer mixture containing an α-aryl substituted monoolefin and an α-alkyl alkylacrylate ester monomer under conditions designed for overpolymerization of said monomers on the polymer particles of the latex to the substantial exclusion of the formation of new polymer particles within said latex;

the relative proportion of structural units in the copolymer component of step (b) being adjusted to insure that such components is elastomeric in nature, and the relative proportion of structural units in the copolymer component of step (c) being adjusted to insure that such component is harder than the component of step (b); and the relative concentration in the thermoplastic composition of the component of step (a) being in the range of from about 5 to about 20 weight percent; the concentration of the component of step (b) being in the range of from about 50 to about 75 weight percent; and, the concentration of components of step (c) being in the range of from about 15 to about 40 weight percent.

9. A method for extending the useful life of rigid polymers by enhancing their impact resistance, said method comprising modifying said rigid polymer by incorporation therein an impact modifier effective amount of polymer particles prepared by (a) providing a seed latex wherein the polymer particles have an average size in the range of from about 200 to 2000 Å and a $T_g$ less than about 20° C., said seed consisting essentially of a polymer derived from an alkyl acrylate monomer and from about 0.1 to about 5 weight percent cross-linking monomer or a copolymer derived from a major amount, by weight, of an alkyl acrylate monomer, a minor amount, by weight, of an addition monomer and from about 0.1 to about 5 weight percent cross-linking monomer, the alkyl moiety of the alkyl acrylate monomer comprising an aliphatic or alicyclic hydrocarbon radical having 3 to 12 carbon atoms and the addition monomer being selected from the group consisting of vinyls, acrylic acid esters and nitrile functional monomers derived from acrylic acid esters; (b) contacting said polymer particles within the latex with butadiene monomer or a monomer mixture containing butadiene and an alkyl acrylate ester or butadiene and an addition monomer under conditions designed for overpolymerization of said monomers on the polymer particles of the latex to the substantial exclusion of the formation of new polymer particles therefrom; and (c) contacting the overpolymerized polymer particles of said latex formed in step (b) with a monomer mixture containing an $\alpha$-aryl substituted monoolefin and an $\alpha$-alkyl alkylacrylate ester monomer under conditions designed for overpolymerization of said monomers on the polymer particles of the latex to the substantial exclusion of the formation of new polymer particles within said latex;

the relative proportion of structural units in the copolymer component of step (b) being adjusted to insure that such components is elastomeric in nature, and the relative proportion of structural units in the copolymer component of step (c) being adjusted to insure that such component is harder than the component of step (b); and the relative concentration in the thermoplastic composition of the component of step (a) being in the range of from about 5 to about 20 weight percent; the concentration of the component of step (b) being in the range of from about 50 to about 75 weight percent; and, the concentration of components of step (c) being in the range of from about 15 to about 40 weight percent.

* * * * *